(12) United States Patent
Hiltunen (10) Patent No.: US 10,736,412 B2
(45) Date of Patent: Aug. 11, 2020

(54) FLEXIBLE TORSION SHAFT AND AN ARRANGEMENT USING IT AND A CLEANING DEVICE FOR AIR-CONDITIONING DUCTS

(71) Applicant: BIERKÜHL OY, Mikkeli (FI)

(72) Inventor: Pentti Hiltunen, Mikkeli (FI)

(73) Assignee: BIERKÜHL OY, Mikkeli (FI)

( * ) Notice: Subject to any disclaimer, the term of this patent is extended or adjusted under 35 U.S.C. 154(b) by 253 days.

(21) Appl. No.: 15/698,371

(22) Filed: Sep. 7, 2017

(65) Prior Publication Data

US 2017/0367470 A1 Dec. 28, 2017

Related U.S. Application Data (63) Continuation-in-part of application No. PCT/FI2016/050146, filed on Mar. 10, 2016.

(30) Foreign Application Priority Data

Mar. 10, 2015 (FI) ...................................... 20155157
Jan. 15, 2016 (FI) ...................................... 20165025

(51) Int. Cl.
*A46B 13/02* (2006.01)
*B08B 9/045* (2006.01)
(Continued)

(52) U.S. Cl.
CPC ............ *A46B 13/02* (2013.01); *A46B 5/0037* (2013.01); *B08B 1/04* (2013.01); *B08B 9/045* (2013.01);
(Continued)

(58) Field of Classification Search
CPC .................. A46B 13/02; A46B 5/0037; A46B 2200/3013; F16C 1/02; B08B 1/04; B08B 9/045
(Continued)

(56) References Cited

U.S. PATENT DOCUMENTS 5,265,911 A 11/1993 Goode
5,363,929 A * 11/1994 Williams .................. E21B 4/02
464/181

(Continued)

FOREIGN PATENT DOCUMENTS

EP 0650774 A1 5/1995
EP 0806219 A1 11/1997
(Continued)

OTHER PUBLICATIONS

International Search Report for PCT/FI2016/050146, dated Jun. 21, 2016.

(Continued)

*Primary Examiner* — Greg Binda
(74) *Attorney, Agent, or Firm* — FisherBroyles, LLP; Robert Kinberg (57) ABSTRACT

A flexible composite torsion shaft for attachment to a drive shaft includes an elongated core element having a circular cross section. A reinforcement comprising at least one polymer layer and multiple layers of reinforcing-fiber wound around the core element inside the at least one polymer layer. Each reinforcing-fiber layer is wound around the core element at a winding angle in a range of 40° to the hoop winding angle, depending on a width of a reinforcing-fiber being wound, relative to a longitudinal direction of the core element. At least one reinforcing-fiber-layer is wound at an opposite angle from another reinforcing-fiber layer inside the at least one polymer layer. The winding angle increases as an average layer diameter of reinforcing-fiber insider the at least one polymer layer increases.

16 Claims, 5 Drawing Sheets (51) Int. Cl.
 *B08B 1/04* (2006.01)
 *A46B 5/00* (2006.01)
 *F16C 1/02* (2006.01)

(52) U.S. Cl.
 CPC ........ *F16C 1/02* (2013.01); *A46B 2200/3013* (2013.01)

(58) Field of Classification Search
 USPC .................................................. 464/58, 181
 See application file for complete search history.

(56) References Cited

U.S. PATENT DOCUMENTS

| | | | |
|---|---|---|---|
| 5,816,923 | A | 10/1998 | Milo et al. |
| 6,267,679 | B1 * | 7/2001 | Romano ............ A61B 17/1642 464/58 |
| 7,089,623 | B1 | 8/2006 | Mäkipää et al. |
| 2008/0229527 | A1 | 9/2008 | Berry et al. |
| 2009/0083915 | A1 | 4/2009 | Cicchelli et al. |
| 2014/0123529 | A1 | 5/2014 | Williams et al. |

FOREIGN PATENT DOCUMENTS

| | | |
|---|---|---|
| EP | 0972154 A1 | 1/2000 |
| FI | 94221 B | 4/1995 |
| FI | 108408 B | 1/2002 |
| FI | 9567 U1 | 2/2012 |
| FI | 123198 B | 12/2012 |
| WO | 98/45635 A1 | 10/1998 |

OTHER PUBLICATIONS

Written Opinion for PCT/FI2016/050146, dated Jun. 21, 2016.
Supplementary Search Report for European Patent Application No. 16761149 dated Sep. 28, 2018.

* cited by examiner

FLEXIBLE TORSION SHAFT AND AN ARRANGEMENT USING IT AND A CLEANING DEVICE FOR AIR-CONDITIONING DUCTS

CROSS-REFERENCE TO RELATED APPLICATIONS

This application is a continuation-in-part of International Patent Application No. PCT/FI2016/050146, filed Mar. 10, 2016, designating the United States, and claiming benefit of Finland Patent Application No. 20155157, filed Mar. 10, 2015, and Finland Patent Application No. 20165025, filed Jan. 15, 2016, the disclosures of which are incorporated herein by reference in their entirety.

FIELD OF THE INVENTION

The present invention relates to a flexible torsion shaft for attachment to a drive shaft, as well as an arrangement using a casing tube. A cleaning device for air-conditioning ducts is one particular application.

BACKGROUND OF THE INVENTION

The flexible shaft according to the invention is suitable for transmitting a torsion force in many applications, particularly when used inside a casing tube. In particular, this case, discloses an air-conditioning cleaning device, which is known from, among others, Finnish patents 94221 and 108408 and from utility model 9567. In the device for cleaning air-conditioning ducts, a flexible shaft is used to rotate a cleaning brush. The brush device used in the solution comprises a motor-driven brush, which is supported on the wall of the duct with the aid of a carrier brush. The flexible operating arm comprises a casing tube and a braided steel cable fitted inside it. The flexible shaft is rigidly attached from the casing tube to the body of the drive motor. The drive shaft is rigidly joined to the shaft of the motor, so that torque is efficiently transmitted in the long, flexible shaft to the brush head. During cleaning, the brush head is operated in both directions.

A steel cable of this kind can be wound to either the right or the left. Its torque-transmitting capability is therefore not symmetrical. A second drawback with this known solution is that the steel cable is heavy, with the reel weighing as much as several tens of kilograms.

SUMMARY OF THE INVENTION

The present invention is intended to eliminate the drawbacks and create an improved device for cleaning air-conditioning ducts. The torsion shaft according to the invention is characterized by being a flexible composite torsion shaft (12), intended to be attached to a drive shaft, and having a core element (18, 18') and a reinforcement comprising a polymeric base substance (17, 17') and a multi-layer (16, 16', 16", 16''') reinforcing fiber reinforcement with each reinforcing fiber layer wound around the core element (18) at a winding angle in a range of 40° to the hoop-winding angle depending on a width of a reinforcing fiber being wound, each preferably in the range 50°-85°, with at least one layer having an oppositely wound reinforcing fiber reinforcement, in which the winding angle increases as the average diameter of the layer increases. The reinforcing fiber layer thus comprises one winding layer at a selected angle. In the manufacturing stage, polymer is fed from consecutive extruders, but the polymer finally forms a network, homogenously combining all the feed layers.

The solution according to the invention has the advantage that the cross-braided composite cable has very great torsion-strength symmetrical torque properties relative to its weight. It is also considerably lighter than a steel cable. These advantages make the torsion shaft, and through it the entire cleaning device, more user-friendly.

A polyurethane-based polymer and a winding angle of 45-57 degrees are preferably used to create a high-powered and flexible torsion shaft. Further, in an improved embodiment a polymer is used, which has a great elongation (150-500%) and tensile strength (10-40 Mpa). The great elongation and tensile strength make it possible to exploit the great tensile strength of the fiber without the fiber cutting the structure open.

The body of the torsion shaft is preferably of epoxy and the reinforcing fibers are mainly of glass fiber. Polyamide (Nylon®), aramid (Kevlar®), ultra-high-molecular-weight polyethylene (UHMWPE) (Dyneema®), and carbon fiber can also be used for this purpose. The flexible torsion shaft is preferably manufactured by means of pultrusion, in which filament fibers are wound around a preform. Some type of standard filament winder machine can be used. The fibers to be wound around the core wire are soaked in resin and a layer of a chosen thickness is hardened in an oven. In an embodiment, a plurality of consecutive reinforcing-fiber layers alternate in opposite directions of the winding. Thus, the machine winds each layer in two directions, so that by pulling backwards and forwards the winding angles are in opposite directions and the torsion shaft is naturally given symmetrical properties.

According to the invention, the desired strength and stiffness properties are achieved by winding several layers around a core wire, preferably at different winding angles. The main rule for the outer layers to be wound at an averagely steeper angle relative to the core wire. The fibers weigh 50-75% of the total weight. In an embodiment, the reinforcing-fiber of an innermost reinforcing-fiber layer wound around the core is at a lower winding angle than other reinforcing-fiber layers.

Steeper winding (e.g., 80°) creates a torsional force (in the outer surface), while a gentler (e.g., 40-50°) winding angle creates stiffness and tensile strength. The embodiments use suitable combinations to achieve an optimal result. A great torsional force together with flexibility is most easily achieved using urethane combined with a winding angle of 45-57°).

The casing tube is preferably of polyamide, so that the material hardness and other properties will minimize friction.

The diameter of the flexible torsion shaft is 2-20 mm, preferably 6-16 mm. The diameter of the core (wire, cable, or braided cord or rubber, e.g. EPDM) is arranged in such a way that the casing layer has a total thickness of at most 5 mm, preferably at most 3.5 mm.

A particularly advantageous totality is achieved, if the flexible shaft is coated with polytetrafluorethylene, i.e. PTFE (Teflon®).

In brush cleaning devices, the flexible torsion shaft 12 should have a minimum radius R of curvature of 30-200 cm, preferably 50-100 cm. In other uses, such as in a drill's flexible torsion shaft, the flexibility can be substantially smaller.

BRIEF DESCRIPTION OF THE DRAWINGS

In the following, the invention is described in greater detail with the aid of an embodiment example with reference to the accompanying drawings, in which.

DETAILED DESCRIPTION OF THE INVENTION

The components of the flexible shaft arrangement 10 are a casing tube 14 and the torsion shaft 12 itself. The length of the shaft arrangement can be 1-40 m and the diameter of the torsion shaft 12, 4-20 mm.

Figure 3:
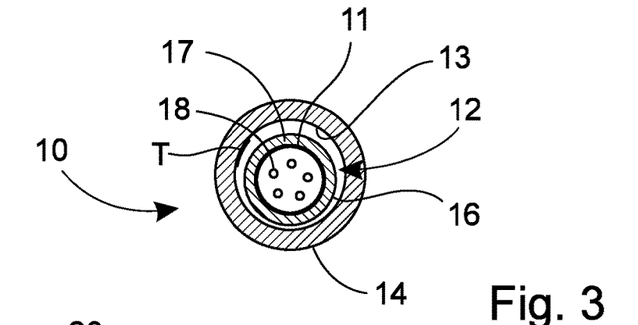
FIG. 3 shows a cross-section of the shaft of FIG. 1.

The casing tube 14 is typically of polyamide and is intended to protect structures by keeping the rotating torsion shaft 12 away from, e.g. the duct structures. Polyamide has a low coefficient of friction with most of the polymers binding the reinforcing fibers, such as epoxy or polyurethane. A particularly advantageous totality is achieved if the flexible shaft is coated with polytetrafluorethylene, i.e. PTFE (Teflon®). Alternatively, the inner surface 13 of the protective tube is covered with a layer T of PTFE (FIG. 3).

Figure 1:
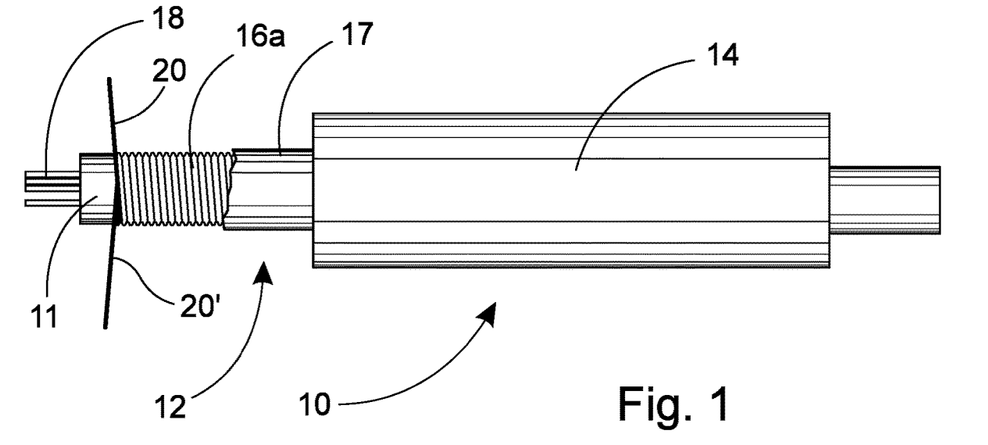
FIG. 1 shows a schematic side view of the construction of the flexible shaft.
Figure 2:
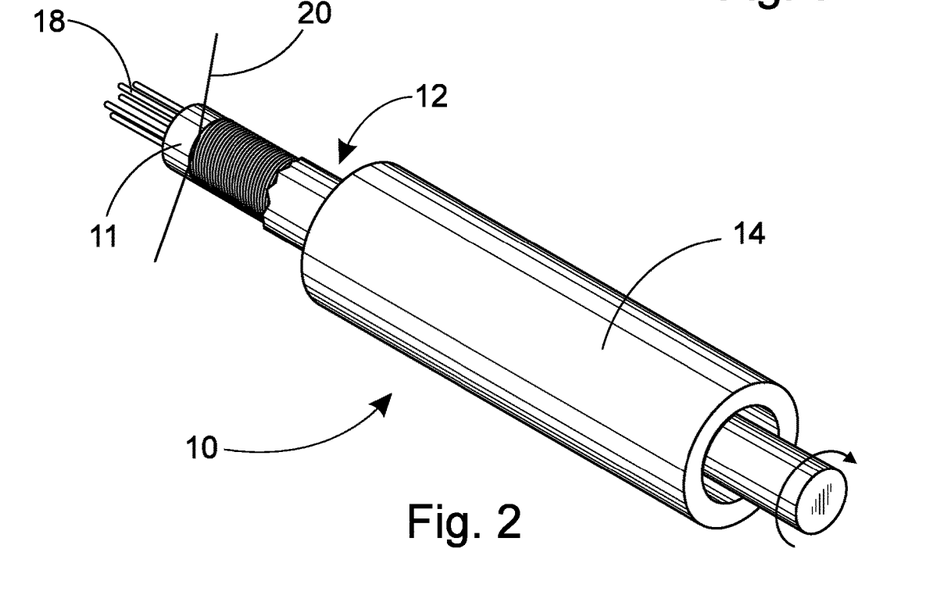
FIG. 2 shows an axonometric view of the shaft of FIG. 1.

The body of the torsion shaft 12 of FIG. 1 is of epoxy and filament wires 20, 20', generally of glass fiber, are wound on top of it in two directions. In this case, the core is a bunch of fibers 18 and a polyethylene membrane 11 is on top of it. Unlike in the figure, the bunch of fibers fills the entire space and the resin is impregnated inside the bunch.

The winding angle of the filament wires 20, 20' is critical to the torsional stiffness. In the figures, the winding angle is in the order of 75°. Preferably it is 60-85°. A gentle winding angle will make the torsion shaft stiff, leading to a large curvature radius. A large winding angle gives good torsional stiffness. Several layers can be wound at different angles to achieve the desired strength and stiffness properties. The reinforcing-fiber of an innermost reinforcing-fiber layer wound around the core is at a lower winding angle than other reinforcing-fiber layers. Preferably, the outermost layers are always wound at a steeper angle relative to the core wire. The weight of the fibers is 50-70% of the total weight.

The axial filaments 18, which are important in terms of the tensile strength of the shaft, are marked in the figures.

The flexible torsion shaft has a diameter of 4-20 mm, preferably 6-12 mm. The length of such shafts is in the range 2-40 m. Nominal torque M is in the range 2-30 Nm and the torsional shaft's diameter D is then in the range $$D = 2.2 \text{ mm} \times \sqrt{(M/Nm)} \pm 30\%$$

Typical values:

Length 2 m, diameter 3 mm, nominal torque 2 Nm

Length 30 m, diameter 8-12 mm, nominal torque 10-30 Nm.

It is important to adjust the material hardness of the casing tube, as it determines the magnitude of the friction.

In one embodiment, the core, i.e. the core wire, is a nylon cord, with epoxy cast on top of it and glass-fiber filaments wound on the surface. The fiber bunch, fabric cord, or braided rubber twine used as the core should be isolated, to prevent the epoxy from being absorbed in the core. Either absorption with oil, or a suitable membrane such as polyethylene can be used to achieve this isolation.

According to the invention, multi-layer reinforcing fiber winding is used and, if necessary, at least two different polymer layers, with a hard inner layer and a more elastic polymer outer layer. One such polymer pair is Axson tech. (FR) EPOLAM 2040 (hard epoxy) and EPOLAM 8064R (flexible epoxy). Usually, a layer thickness of less than 2 mm does not require a second polymer. The casing layer usually has a thickness of at most 5 mm, preferably at most 3.5 mm. Experience has shown that a layer thickness greater than 4 mm and generally greater than 3.5 mm is of no benefit, as then the torsion shaft loses its elasticity. In the surface layer, polyurethane can be used, which has an elasticity many times that of the elastic epoxy referred to above. The problem with epoxy is its poor elongation, which leads to stiffness in the shaft. The same manufacturer's polyurethane resins are 'RE11550 polyol' and 'RE1020-isocyanate', a mixture of which has an elongation value of 230%. In addition to these, hybrid resins are available, with different grades of resin, such as epoxy and urethane resins, being arranged together. The core component is intended to prevent buckling in the casing component when the torsion shaft is bent into a curve. It is obvious that as polymers develop the performance values of the end product will develop further.

Figure 4:
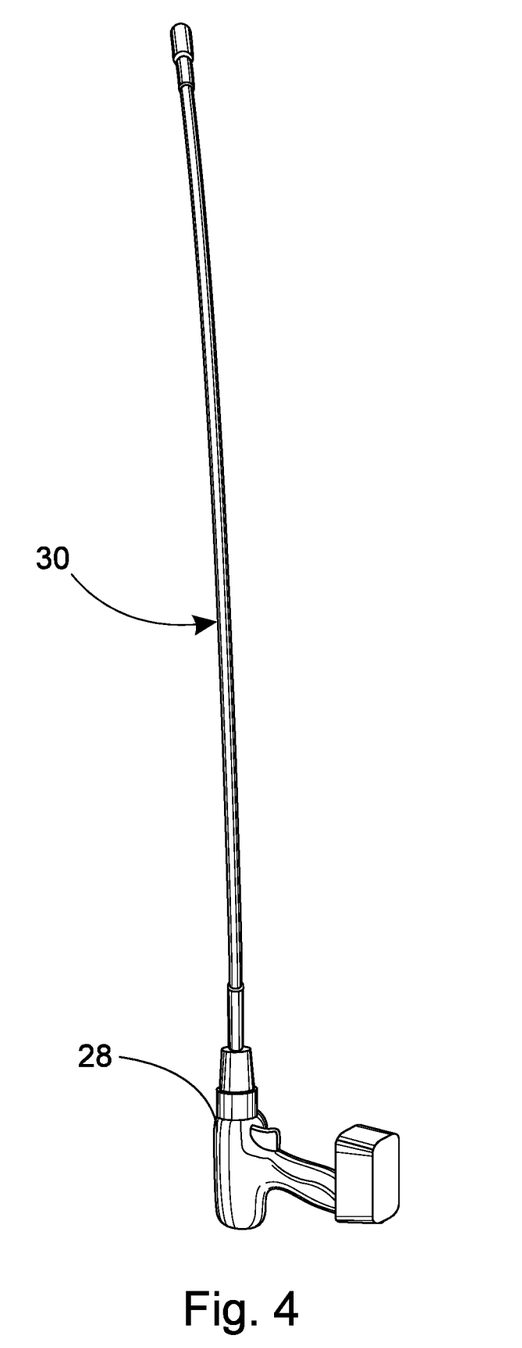
FIG. 4 shows a drill/screwdriver equipped with the flexible shaft.

FIG. 4 shows a flexible shaft 30 about a meter in length, which is attached to a drill 28 and is fitted inside a casing tube and used to drive a cleaning brush or other tool. The embodiment of FIG. 4 does not require a shaft as flexible as that above. A relatively rigid shaft can be suitable for many purposes. The casing tube can be held by hand, or held in place by the body of the device being driven. The winding angle can then be 45°, generally 40°-60°.

The diameter of drill shafts can be 2-8 mm. Shafts with a diameter of 2-4 mm, for example, are suitable for opening drainpipes.

Figures 5, 6:
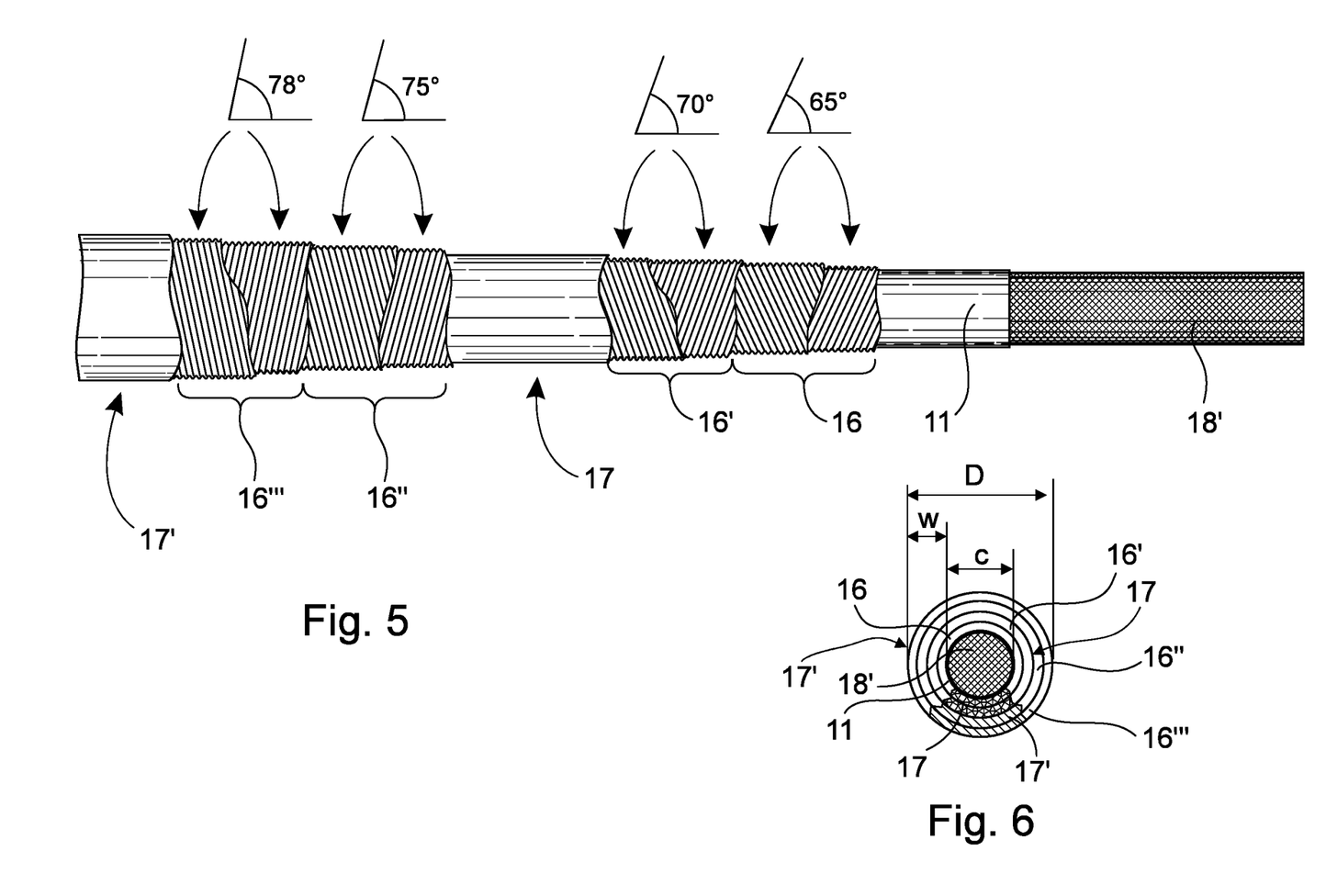
FIG. 5 shows the construction of the multi-layer torsion shaft in partial cross-section.
FIG. 6 shows a cross-section of the shaft of FIG. 5.

In the latest embodiments, the core is a flexible, braided cord, which allows the internal diameter of the polymer layer to be increased in step with the external diameter. Thus, for example, in one torsion shaft with a diameter of 8 mm (FIGS. 5 and 6), the rubber core cord 18' (braided) has a diameter of 2 mm. This is topped by a thin (0.1 mm) polyethylene film 11 to prevent the absorption of epoxy resin. Reinforcing-wire layers 16, with a thickness of 600 Tex (glass-fiber), wound at a gentle winding angle of 65°, in alternating directions, come first inside the inner, hard, polymer layer 17 (thickness 1.5 mm). Layers of the same polymer follow on top of it containing reinforcing-wire layers 16' at a steeper 70° angle, also alternating in different direction, until a total thickness of 1.5 mm is achieved. Layers 16" of reinforcing-fiber, in alternating directions, lie in an outer, elastic polymer (epoxy) layer 17' (thickness 1.5 mm) at an increasingly steep angle (75°), until a last layers 16''' of wire are hoop wound at about a 78° angle around layers 16" also in alternating different directions. About 14 reinforcing-fiber layers are made with 0.2-mm wire (roving), which make a thickness of about 3 mm together with the epoxy resin. In an improved embodiment, the polymer layer comprises a polymer that has a great elongation in an range of 150%-500% and tensile strength in a range of 10 Mpa-40 Mpa.

Figure 8:
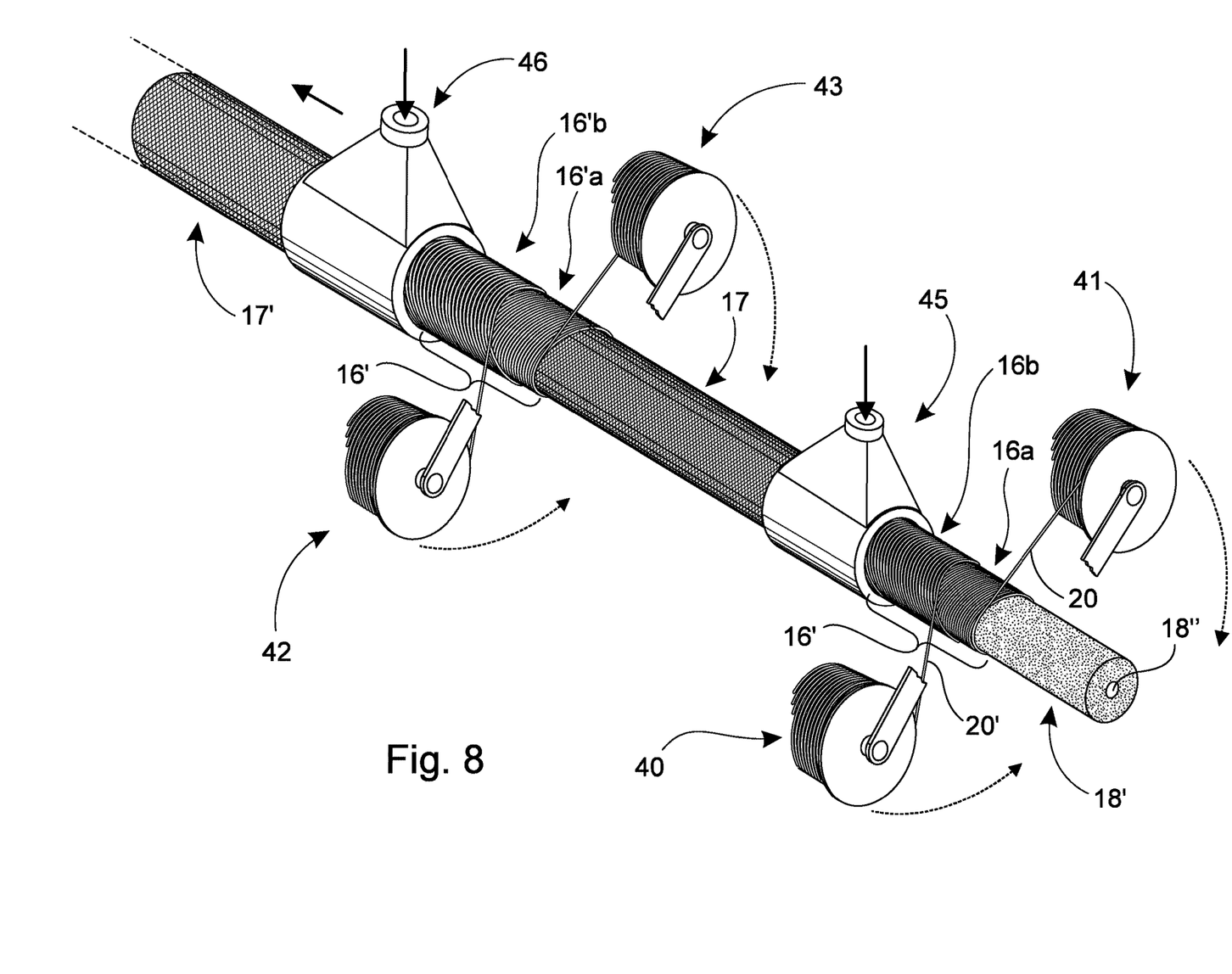
FIG. 8 shows schematically an industrial manufacturing method for the shaft.

In newer embodiments, the same fiber as in the winding is preferably used as the core, i.e. the center wire, the center wire (bunch) beings impregnated with the same resin as the winding layers, because it must have the same heat resistance as them. It is possible to use, as the center wire or core cord, a round power-transmission belt, in which, for example, there is a polyester thread 18″ and a polyurethane coating (FIG. 8).

Reinforcing fibers: glass-fiber, polyamide (Nylon®), aramid (Kevlar®), UHMWPE (Dyneema®), carbon fiber. Rovings to be used 100-600 Tex (glass-fiber bunches), in a circular fiber bunch, thickness 0.1-1 mm.

Figure 7:
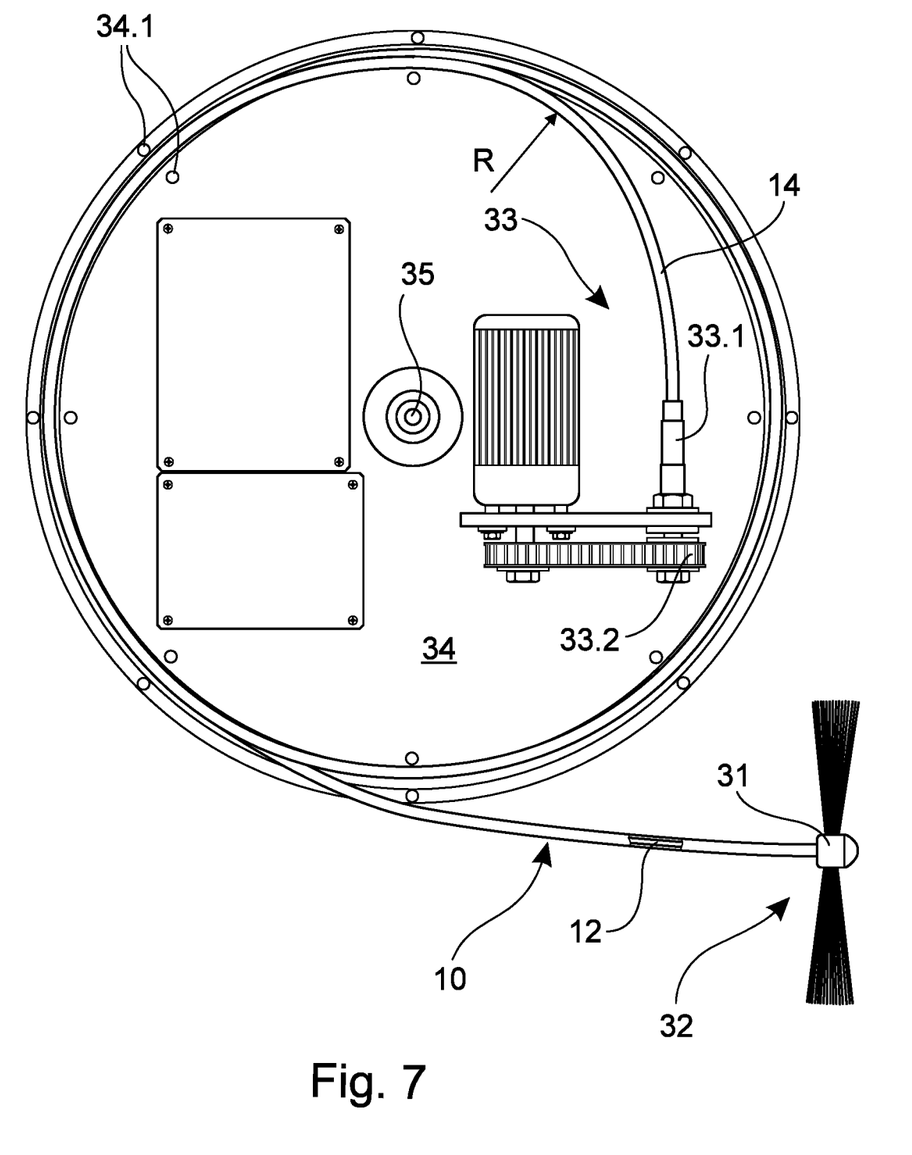
FIG. 7 shows one brush cleaning device.

Brush cleaning devices for air-conditioning ducts, of which an example is the device according to utility model FI-U-9567, shown in FIG. 7, are a particular application of the flexible torsion shaft. The flexible torsion shaft according to the invention suits nearly all machines designed for a corresponding task, in which the flexible torsion shaft together with the casing tube can be reeled onto a reel of a quite small diameter (60-120 cm). In brush cleaning devices, the flexible torsion shaft 12 should have a minimum radius of curvature R of 30-200 cm, preferably 50-100 cm. The brush cleaning device according to FIG. 7, incorporates a disc 34, set to be rotated with the aid of a shaft 35. The circumference of the disc 34 has pins 34.1, between which the flexible torsion shaft 10 with a casing tube is reeled. The brush device 31 is attached to the flexible shaft in the hub 32. The start of the casing tube 14 is permanently attached to the motor assembly's 33 body and the torsion shaft 12 itself is attached to a rotating toothed-belt gearwheel 33.2. The rotating force generally comes through the shaft; however the construction of the rotation device does not fall within the scope of the present invention.

The newest embodiments use the following dimensions.

TABLE 1

| Shaft diameter (D) mm | Core thickness (C) mm tolerance ±30% | Wall thickness (W) mm tolerance ±15% |
|---|---|---|
| 4 mm | 0.5 mm | 1.7 mm |
| 6 mm | 0.5 mm | 2.75 mm |
| 8 mm | 1 mm | 3.5 mm |
| 10 mm | 3 mm | 3.5 mm |
| 12 mm | 5 mm | 3.5 mm |
| 14 mm | 7 mm | 3.5 mm |
| 16 mm | 9 mm | 3.5 mm |
| 18 mm | 10 mm | 4 mm |
| 20 mm | 12 mm | 4 mm |
| 30 mm | 20 mm | 5 mm |

The wall thickness is usually 3.5 mm±20%, if the shaft diameter is 8 mm or greater and in thinner shafts 45±10% of the diameter.

In winding, a fiber is used, the thickness of which is 100 tex-800 tex (±20%), corresponding to the table's diameter range 4 mm-20 mm.

The fibers are run at a winding angle in the range 45°-hoop winding (tightly next to each other, preferably 55-85° depending slightly on the diameter, for example:
4-mm diameter: 55°-85°,
16-mm diameter: 58°-about 80° (hoop winding).
Preferred matrix: thermosetting polyurethane prepolymer resin.
Shaft coated with Xylan 1010 PTFE coating (Teflon®).
PTFE="Polytetrafluorethylene".
Core—matrix PU (same).

In industrial manufacture, either cross-winding machines equipped with up to 40-metre-long back-and-forwards winding devices are available, or else continuously operating pull-winding machines (FIG. 8), in which there are a chosen number of consecutive winding devices 40/41, 42/43, and extruder units 45,46 for manufacturing a multi-layer shaft. FIG. 8 shows the principle of such a machine.

For continuous drive, a drive rope is needed, which is preferably a round belt commonly used in transmissions, in which there is a center thread 18″ and a polyurethane coating. For example, an 8-mm Eagle Green 89 Reinforced Textured Round by Fenner Drives, Inc. USA, can be used. This provides a tension of 116 N at an elongation of 3%.

The core cord 18' can be pulled from a large reel (not shown), which can contain up to several kilometers for continuous production. FIG. 8 shows two winding pairs 40/41 and 42/43, but there can be the number of them necessary for the selected layer thickness. In FIG. 8, polymer impregnation using extruders 45 and correspondingly 46, takes place after two fiber layers, but several reinforcing-fiber layers can be taken into the same impregnation, provided the polymer is absorbed in the entire layer.

In FIG. 8, fiber-layers 16*a* and 16*b*, which are impregnated using a first extruder 45 to create a first polymer layer 17, are wound using a winding pair 40/41 on top of a core cord 18'. The use of a retardant approved by the manufacturer may be necessary in the polymer to slow hardening, to allow the polymer layers to integrate with each other. The next fiber winding takes place using winding pairs 42/43, thus forming fiber layers 16'*a* and 16'*b*, at a slightly greater angle relative to the shaft than the preceding ones (as in FIG. 5). This is led in turn to the following extruder 46, which forms the next polymer layer 17'. This is repeated for as many times as needed to reach the chosen shaft thickness. Due to the winding geometry, each winding machine may have to be arranged separately, because particularly at the start winding takes place at a considerable angle relative to the perpendicular plane, with the next winding slanting at the opposite angle.

It will be understood that the above description of the present invention is susceptible to various modifications, changes and adaptations, and that the same are intended to be comprehended within the meaning and range of equivalents of the appended claims.

What is claimed is:

1. A flexible composite torsion shaft for attachment to a drive shaft, comprising:
    an elongated core element having a circular cross section;
    a reinforcement comprising at least one polymer layer; and
    multiple layers of reinforcing-fiber wound around the core element inside the at least one polymer layer, each reinforcing-fiber layer being wound around the core element at a winding angle in a range of 40° to the hoop winding angle, depending on a width of a reinforcing-fiber being wound, relative to a longitudinal direction of the core element, wherein at least one reinforcing-fiber-layer is wound at an opposite angle from another reinforcing-fiber layer inside the at least one polymer layer, wherein the winding angle increases as an average layer diameter of reinforcing-fiber inside the at least one polymer layer increases, and wherein the reinforcing-fiber of an innermost reinforcing-fiber layer wound around the core is at a lower winding angle than other reinforcing-fiber layers.

2. The flexible torsion shaft according to claim 1, wherein a plurality of consecutive reinforcing-fiber layers alternate in opposite directions of the winding angle.

3. The flexible torsion shaft according to claim 1, wherein the at least one polymer layer comprises polyurethane.

4. The flexible torsion shaft according to claim 1, wherein at least one reinforcing-fiber layer is selected from a group comprising one of the following: glass fiber, polyamide, aramid, ultra-high-molecular-weight polyethylene (UHM-WPE), and carbon fiber.

5. The flexible torsion shaft according to claim 1, wherein the flexible torsion shaft has a length in a range of 1 m-40 m.

6. The flexible torsion shaft according to claim 5, wherein the flexible torsion shaft has a minimum curvature radius in a range of 30 cm-200 cm.

7. The flexible torsion shaft according to claim 1, wherein the reinforcing-fibers have a weight in a range of 50%-75% of the total weight.

8. The flexible torsion shaft according to claim 1, further including an outer coating of PTFE.

9. An arrangement comprising the flexible torsion shaft according to claim 1, and a casing tube fitted around the flexible torsion shaft.

10. The arrangement according to claim 9, wherein the casing tube comprises a polyamide.

11. The arrangement according to claim 9, wherein the casing tube has an inner surface having a PTFE coating.

12. A flexible composite torsion shaft for attachment to a drive shaft, comprising:
an elongated core element having a circular cross section;
a reinforcement surrounding the core element and comprising at least inner and outer polymer layers, wherein the inner polymer layer is of a harder polymer than the outer polymer layer which is of a more elastic polymer than the inner polymer layer; and
multiple layers of reinforcing-fiber wound around the core element inside each of the inner and outer polymer layers, each reinforcing-fiber layer being wound around the core element at a winding angle in a range of 40° to the hoop winding angle, depending on a width of a reinforcing-fiber being wound, relative to a longitudinal direction of the core element, wherein at least one reinforcing-fiber layer is wound at an opposite angle from another reinforcing-fiber layer inside the respective inner and outer polymer layers, wherein the winding angle increases as an average layer diameter of reinforcing-fiber inside the respective inner and outer layer increases.

13. A flexible composite torsion shaft for attachment to a drive shaft, comprising:
an elongated core element having a circular cross section;
a reinforcement comprising at least one polymer layer; and
multiple layers of reinforcing-fiber wound around the core element inside the at least one polymer layer, each reinforcing-fiber layer being wound around the core element at a winding angle in a range of 40° to the hoop winding angle, depending on a width of a reinforcing-fiber being wound, relative to a longitudinal direction of the core element, wherein at least one reinforcing-fiber layer is wound at an opposite angle from another reinforcing-fiber layer inside the at least one polymer layer, wherein the winding angle increases as an average layer diameter of reinforcing-fiber inside the at least one polymer layer increases, and wherein the at least one polymer layer comprises a polymer that has a great elongation in a range of 150%-500% and a tensile strength in a range of 10 Mpa-40 Mpa.

14. The flexible torsion shaft according to claim 13, wherein the torsion shaft has a nominal torque M in a range of 2 Nm-30 Nm and a diameter in a range of 2.2 mm×√(M/Nm)±30%.

15. A series of flexible torsion shafts each for attachment to a drive shaft, each flexible torsion shaft comprising:
an elongated core element having a circular cross section;
a reinforcement comprising at least one polymer layer; and
multiple layers of reinforcing-fiber wound around the core element inside the at least one polymer layer, each reinforcing-fiber layer being wound around the core element at a winding angle in a range of 40° to the hoop winding angle, depending on a width of a reinforcing-fiber being wound, relative to a longitudinal direction of the core element, wherein at least one reinforcing-fiber-layer is wound at an opposite angle from another reinforcing-fiber layer inside the at least one polymer layer, wherein the winding angle increases as an average layer diameter of reinforcing-fiber inside the at least one polymer layer increases, wherein the flexible torsion shafts in the series have diameters, average core thicknesses, and wall thicknesses according to the following table:

| Shaft diameter mm | Core thickness mm tolerance ±30% | Wall thickness mm tolerance ±15% |
| --- | --- | --- |
| 4 mm | 0.5 mm | 1.7 mm |
| 6 mm | 0.5 mm | 2.75 mm |
| 8 mm | 1 mm | 3.5 mm |
| 10 mm | 3 mm | 3.5 mm |
| 12 mm | 5 mm | 3.5 mm |
| 14 mm | 7 mm | 3.5 mm |
| 16 mm | 9 mm | 3.5 mm |
| 18 mm | 10 mm | 4 mm |
| 20 mm | 12 mm | 4 mm |
| 30 mm | 20 mm | 5 mm. |

16. A device for cleaning air-conditioning ducts, comprising: an arrangement comprising:
a flexible composite torsion shaft for attachment to a drive shaft, the flexible composite torsion shaft comprising:
an elongated core element having a circular cross section;
a reinforcement comprising at least one polymer layer;
multiple layers of reinforcing-fiber wound around the core element inside the at least one polymer layer, each reinforcing-fiber layer being wound around the core element at a winding angle in a range of 40° to the hoop winding angle, depending on a width of a reinforcing-fiber being wound, relative to a longitudinal direction of the core element, wherein at least one reinforcing-fiber-layer is wound at an opposite angle from another reinforcing-fiber layer inside the at least one polymer layer, and wherein the winding angle increases as an average layer diameter of reinforcing-fiber inside the at least one polymer layer increases; and
a casing tube fitted around the flexible torsion shaft; and
reeling means operatively connected to the flexible torsion shaft fitted with the casing tube;
drive-motor machinery adapted for rotating the flexible torsion shaft; and
a brush device attached to a free end of the flexible torsion shaft.

* * * * *